US008278929B2

(12) United States Patent
Summerfield et al.

(10) Patent No.: US 8,278,929 B2
(45) Date of Patent: Oct. 2, 2012

(54) DETERMINING ORIENTATION FOR SEAFLOOR ELECTROMAGNETIC RECEIVERS

(75) Inventors: Philip J. Summerfield, Katy, TX (US); Tom C. Phillips, Santa Fe, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 926 days.

(21) Appl. No.: 12/301,604

(22) PCT Filed: Mar. 22, 2007

(86) PCT No.: PCT/US2007/007139
§ 371 (c)(1),
(2), (4) Date: Nov. 19, 2008

(87) PCT Pub. No.: WO2007/136451
PCT Pub. Date: Nov. 29, 2007

(65) Prior Publication Data
US 2009/0184715 A1    Jul. 23, 2009

Related U.S. Application Data

(60) Provisional application No. 60/801,888, filed on May 19, 2006.

(51) Int. Cl.
*G01V 3/00* (2006.01)
(52) U.S. Cl. .......................... 324/334; 324/365; 324/370
(58) Field of Classification Search .......... 324/365–370, 324/334
See application file for complete search history.

(56) References Cited

U.S. PATENT DOCUMENTS

| | | | |
|---|---|---|---|
| 5,361,130 A | 11/1994 | Kersey et al. | 356/345 |
| 5,680,489 A | 10/1997 | Kersey | 385/12 |
| 5,818,585 A | 10/1998 | Davis et al. | 356/345 |

(Continued)

FOREIGN PATENT DOCUMENTS

WO    WO2004/049008    6/2004
(Continued)

OTHER PUBLICATIONS

Behrens, J. (2005) "The Detection of Electrical Anisotropy in 35 Ma Pacific Lithosphere: Results from a Marine Controlled-Source Electromagnetic Survey and Implications for Hydration of the Upper Mantle," Ph.D. Thesis, University of California, San Diego, pp. 37-39 and 86-93.

(Continued)

*Primary Examiner* — Arleen M Vazquez
(74) *Attorney, Agent, or Firm* — ExxonMobil Upstream Research Company Law Dept.

(57) ABSTRACT

Apparatus and method for estimating the 3D orientation angles for remotely deployed devices with flexible arms such as dipole antennas of receivers used in marine controlled-source electromagnetic surveys to explore for hydrocarbons. Acoustic transponders or transducers, or other positioning sensors such as attitude sensors or strain-sensitive fiber optic cables are placed on each electrode arm of the receiver. Acoustic sensors (101) on the receiver frame (94) work in conjunction with the positioning sensor(s) (101) on the electrode arms (92) to provide accurate 3D spatial position of the receiver electrodes (93) relative to the receiver frame. Alternatively, sonar transducers mounted on the frame are used to image the electrode arms, which image can be enhanced by fixing reflectors to the arms. An attitude sensor is mounted on the receiver frame, enabling conversion of the relative electrode positions to an earth reference frame.

18 Claims, 14 Drawing Sheets

U.S. PATENT DOCUMENTS

| | | | | |
|---|---|---|---|---|
| 6,603,313 | B1 | 8/2003 | Srnka | 324/354 |
| 6,674,928 | B2 | 1/2004 | Johnson et al. | 385/12 |
| 6,842,006 | B2 * | 1/2005 | Conti et al. | 324/350 |
| 6,888,623 | B2 | 5/2005 | Clements | 356/73.1 |
| 7,116,108 | B2 * | 10/2006 | Constable | 324/350 |
| 7,141,968 | B2 * | 11/2006 | Hibbs et al. | 324/260 |
| 2003/0094952 | A1 * | 5/2003 | Morrison et al. | 324/330 |

FOREIGN PATENT DOCUMENTS

| | | |
|---|---|---|
| WO | WO2007/018810 | 2/2007 |

OTHER PUBLICATIONS

Belcher, E. O. et al. (1999) "Beamforming and Imaging With Acoustic Lenses in Small, High-Frequency Sonars", *Oceans '99 Conference*, Seattle, Washington.

Chave, A. D. et al. (1991) "Electrical Exploration Methods for the Seafloor," *Electromagnetic Methods in Applied Geophysics* (ed. M.N. Nambighian), vol. 2, Chap. 12, pp. 931-966.

Constable, S. et al. (1996) "Marine Controlled-Source Electromagnetic Sounding," *J. Geophs. Res.*, vol. 101, pp. 5519-5530.

Duncan, R. (2005) "Sensing Shape," *SPIE's oemagazine*, Sep. 2005, pp. 18-21.

de Jong, C. D. et al. (2002) *Hydrography*, ISBN 90-407-2359-1, DUP Blue Print, Delft University Press, pp. 311-317.

Morgan, M. J. (1978) *Dynamic Positioning of Offshore Vessels*, by Max J. Morgan, ISBN 0-87814-044-1, PPC Book Division, The Petroleum Publishing Co, pp. 74-85.

Eidesmo, T. et al. (2002) "Sea Bed Logging (SBL), a New Method for Remote and Direct Identification of Hydrocarbon Filled Layers in Deepwater Areas," *First Break*, vol. 20.3, pp. 144-152.

Ellingsrud, S. et al. (2002) "Remote Sensing of Hydrocarbon Layers by Seabed Logging (SBL): Results From a Cruise Offshore Angola," *The Leading Edge*, pp. 972-982.

MacGregor, L. et al. (2001) "Electrical Resistivity Structure of the Valu Fa Ridge, Lau Basin, From Marine Controlled-Source Electromagnetic Sounding," *Geophy. J. Int.*, vol. 146, pp. 217-236.

Mittet, R. et al. (2004) "Inversion of SBL Data Acquired in Shallow Waters," *EAGE 66$^{th}$ Conference & Exhibition—Z-99*, Paris, France, Jun. 7-10.

Schulz, W. L. et al. (2001) "Long Gage Fiber Optic Bragg Grating Strain Sensors to Monitor Civil Structure," Proceedings, SPIE 4330, pp. 56-65.

Smith and Ward (1974) "On the Computation of Polarization Ellipse Parameters," *Geophysics* 39, pp. 867-869.

*European Standard Search Report* #RS 114087US, dated Sep. 27, 2006, 2 pgs.

*PCT Int'l Search and Written Opinion*, dated Jul. 29, 2008, 7 pgs.

* cited by examiner

DETERMINING ORIENTATION FOR SEAFLOOR ELECTROMAGNETIC RECEIVERS

This application is the National Stage entry under 35 U.S.C. 371 of PCT/US2007/007139, that published as WO 2007/136451 and was filed on Mar. 22, 2007 and claims the benefit of now expired U.S. Provisional application 60/801,888 which was filed on May 19, 2006.

FIELD OF THE INVENTION

This invention relates generally to the field of geophysical prospecting and reservoir delineation, and more particularly to electromagnetic prospecting. Specifically, the invention is a method for determining receiver orientations in electromagnetic surveys of subsurface regions where the receivers cannot be located by hand or be directly measured for orientation, such as ocean-bottom receivers in surveys of regions below the ocean bottom. Adaptation of the invention to other applications such as ocean-bottom seismic data acquisition will be obvious to practitioners in the field.

BACKGROUND OF THE INVENTION

The marine CSEM (Controlled Source Electromagnetic) exploration method uses a man-made source to generate Electromagnetic (EM) waves and deploys receivers on the seafloor (if the survey is in a marine environment) to record EM signals. The recorded EM signals are analyzed to infer sub seafloor structures and/or determine the nature of particular structures, such as reservoirs. FIG. 1 shows the principle of marine CSEM exploration with a Horizontal Electric Dipole (HED) source 11 (depicted with a receiver 13 resting on the seafloor 12). U.S. Pat. No. 6,603,313 is an example of a published disclosure of a CSEM technique for hydrocarbon exploration.

At present, receivers are deployed by free fall to the seafloor or lowered on a winch. In either case, the final orientation of the receiver on the seafloor is unknown. Receiver orientations are required to determine the three-dimensional EM field vectors measured at receiver locations. The measured fields are then decomposed into components in preferred directions (for example, inline, cross-line, and vertical) for analysis, inversion and interpretation. Inaccurate receiver orientations can have significant effects on the decomposed components. Therefore the determination of receiver orientations could significantly affect data interpretation. The present invention provides techniques to determine receiver orientations using independent (non-EM) observations.

In order to completely measure three-dimensional EM fields, receivers need to be equipped with three mutually-perpendicular antennas for electric fields and three mutually-perpendicular magnetic sensors for magnetic fields. Three angles are necessary and sufficient to uniquely define the receiver orientations. These three angles establish the relationships between the measurement coordinates and receiver coordinates. A number of methods can be used to define the receiver orientations in the measurement coordinates. They are equivalent and can be converted from one to another. One way to define the receiver orientations is using azimuth and tilts for two horizontal channels, as indicated in FIG. 2. In FIG. 2, (X, Y, Z) are assumed to be the measurement coordinates with X directed to the geodetic east, Y to the geodetic north, and Z upward. (X''', Y''', Z''') are the receiver coordinates, i.e., are the coordinate system defined by the receiver's antennas, and can be designated the "east", "north" and vertical channels. (X', Y', Z') and (X'', Y'', Z'') are auxiliary coordinates used in the transformation between (X, Y, Z) and (X''', Y''', Z'''). X' is the projection of X''' on the horizontal plane XY, while Y' is the projection of Y'''. With these definitions, the receiver azimuth ($\alpha$) is defined as the angle between Y and Y', the east channel tilt ($\beta$) is the angle between X' and X''', the north channel tilt ($\gamma$) is the angle between Y' and Y'''.

Current EM receiver designs include long horizontal arms with electrodes attached to the ends. Two opposing electrodes form a dipole, with typical dipole lengths ranging between eight (8) and ten (10) meters. The length of the horizontal dipole is dictated by the design signal-to-noise floor. For a given electrode-amplifier combination, the signal-to-noise floor will decrease as the dipole length increases. While there is an obvious benefit for ever increasing horizontal dipole lengths, the receiver package must remain physically manageable, with ease of deployment and recovery being important design considerations. Further, the EM receiver package must remain stationary on the seafloor during data acquisition. Any vibration induced motion (through seafloor currents) will be interpreted as noise. To minimize vibration induced motion, the EM receiver's gravity base must be in direct contact with the seafloor. The horizontal arms must be flexible to follow the general topography of the seafloor, as illustrated in FIG. 3A. Rigid horizontal arms could result in the EM receiver being suspended across topographical features and being subject to significantly reduced signal-to-noise ratios, as illustrated in FIG. 3B.

Current horizontal arms are designed with symmetrical cross-sections, typically circular. The arms are equally flexible in both the horizontal and vertical planes. The flex in the horizontal arm typically may be approximately 5 degrees. It is straightforward to mount a three-dimensional attitude sensor (azimuth, $\alpha$' and two-dimensional tilt, $\beta$' and $\gamma$') on the EM receiver frame. Due to the flexible horizontal arms, $\alpha' \neq \alpha$, $\beta' \neq \beta$ and $\gamma' \neq \gamma$. The differences between the observed and desired quantities will represent a bias for a particular EM receiver deployment. Further, the bias will vary between receivers and between deployments. Asymmetrical cross-section designs (including elliptical and rectangular) could increase the rigidity in the horizontal plane ($\alpha' \Rightarrow \alpha$), but the vertical flexibility will remain ($\beta' \neq \beta$ and $\gamma' \neq \gamma$). The presence of these angular biases has resulted in EM receiver orientations being estimated from CSEM data and not from direct observations. Thus, because CSEM receiver arms need to be flexible, an attitude sensor mounted on the receiver frame is insufficient for determining accurate orientations of the dipole axes.

One common method for estimating receiver orientations from CSEM data is polarization analysis. The method, originally proposed by Smith and Ward ("On the computation of polarization ellipse parameters," *Geophysics* 39, 867-869 (1974)) is based on the fact that the EM field amplitude of the signal recorded by a receiver is maximized when the receiver dipole is in the direction of the transmitter (i.e. the major axis of the polarization ellipse) provided the transmitter is towed directly towards the receiver. Polarization analysis was the main method to determine receiver azimuth in data processing of early marine CSEM applications. The method requires at least one towline be towed directly over each receiver. Receiver azimuth accuracy provided by this method is not very high. The polarization technique is robust partly because it is insensitive to small errors in the orientation angle. Unfortunately the cross-line component is highly sensitive to small orientation errors. The average error in receiver azimuths is larger than 5 degrees from a vessel with a dynamic positioning system. It could be significantly worse using a vessel without dynamic positioning in rough weather conditions, where the source may not be towed directly over the receiver (inducing either an across-line offset or a yaw between the source transmitter and the sail line). Small errors (<10°) in receiver orientation have a negligible effect on the in-line data, but a pronounced effect on the cross-line data, with increased amplitude (Amp $E_y$) and improved coherency in cross-line phase (Phase $E_y$).

Behrens uses coherency and correlation in natural EM signals between receivers to determine relative azimuth. ("The Detection of Electrical Anisotropy in 35 Ma Pacific Lithosphere: Results from a Marine Controlled-Source Electromagnetic Survey and Implications for Hydration of the Upper Mantle," Ph.D. Thesis, University of California, San Diego (2005)). This method was developed for receivers without towing a towline to complement the polarization analysis. The method determines the relative azimuth angle between two receivers. In order to find the receiver's absolute azimuth, the method requires the azimuth of the reference receiver to be known. Success in using this method is dependent on whether high quality natural signals are recorded by both receivers. The accuracy of this method is normally lower than the polarization analysis.

R. Mittet et al. ("E020: Inversion of SBL data acquired in shallow waters," EAGE $66^{th}$ Conference & Exhibition—Paris, France, Jun. 7-10 (2004)) used inversion to determine receiver azimuth. This method overcomes limitations in both the polarization analysis and correlation method by using natural EM signals.

In PCT Patent Publication No. WO 2004/049008 (Electromagnetic Surveying for Hydrocarbon Reservoirs), the inventors state that marine CSEM receiver data are "resolved along a direction perpendicular to a line connecting the source location and the detector location and in a horizontal plane". The publication does not appear to discuss how the detector's attitude is estimated relative to a horizontal plane. The publication further states, "The components of the detected electric field along these directions is determined from the angular orientation of the orthogonal dipole antennae comprising the detector antenna relative to the line joining the source location and the detector location. This can be easily determined using standard instrumentation, such as, for example, active or passive sonar to determine the relative positions of the source location and the detector location, and a magnetic compass to determine the detector antenna orientation". The use of a magnetic compass will estimate the azimuth ($\alpha'$) but not the tilts ($\beta$ and $\gamma$). Moreover, the azimuth that the compass measures will be that of the receiver frame ($\alpha'$), which will differ from that of the dipole ($\alpha$). Further, this publication does not appear to acknowledge the possibility that the arms are not orthogonal in the horizontal plane.

Thus, widely used methods focus on the receiver azimuth ($\alpha'$), but do not appear to disclose how to determine receiver orientations uniquely, i.e. both the azimuth ($\alpha$) and the tilts ($\beta$ and $\gamma$) of the two horizontal channels. The reasons for neglecting the receiver's other two angles may be:

1) Data interpretation is mainly focused on the inline electric component, which is normally not significantly affected by the tilt angles if the seafloor topography is minimal;
2) The vertical electric component is not measured or not fully utilized in data interpretation; and
3) No reliable and accurate data driven method is available to determine the receiver orientations.

The two tilts ($\beta$ and $\gamma$) are normally small (<10 degrees). In order to determine them, it requires that the method itself must fully model the field source and receiver geometry and the acquisition system must accurately record the geometry.

Effects of receiver orientations on the three electric components can be seen in FIGS. 4 through 6. The source and receiver geometry used in this modeling is taken from a field survey. The resistivity model is a layered earth model with a water depth of 125 meters. The towline direction is 265.57 degrees from the geodetic north, clockwise. In the modeling, the receiver (with azimuth $\alpha$ in FIG. 2) misalignment ($\delta\alpha$) with the towline is 15 degrees, the inline dipole tilts ($\beta$) up 5 degrees, and the cross-line dipole tilts ($\gamma$) down 3 degrees. The receiver misalignment ($\delta\alpha$) simulates the misalignment between the dipole ($\alpha$) and receiver frame ($\alpha'$). The modeling frequency is 0.25 Hz. In each of these three drawings, the solid line represents an aligned and level receiver, the circles a level receiver with misalignment $\delta\alpha=15°$, the + symbols an aligned receiver with tilts of $\beta=5°$ and $\gamma=-3°$, and the broken line a misaligned and tilted receiver. FIG. 4 shows the effect of receiver orientations on the inline electric field component, FIG. 5 the crossline electric field component, and FIG. 6 the vertical electric field component. Compared with the ideal situation (a level receiver aligned with the towline), these figures show that the azimuth has a much bigger effect on the two horizontal channels than on the vertical component, especially on the cross component; while the tilts have more effects on the vertical component. These effects can be significant, for example, about one order of magnitude for the cross and vertical components of this example (FIGS. 5 and 6). The example clearly demonstrates the importance of determining all three angles. Receiver azimuth alone cannot uniquely define the orientation of an EM receiver deployed on the seafloor.

Lu (U.S. Provisional Patent Application No. 60/701,817) uses inversion to estimate the receiver's three-dimensional orientations, which are considered parameters in the inversion process. This approach requires a resistivity model, which should be created as close to the truth as possible to make the inversion converge quickly and to avoid a local minimum solution for the inversion.

In summary, a method is needed for determining an EM receiver's three-dimensional orientation without any limitations on transmitter-receiver geometry or any a-priori knowledge of an underlying resistivity model. This invention satisfies this need by estimating the three-dimensional orientation through indirect observations.

SUMMARY OF THE INVENTION

In one embodiment, the invention is a receiver for measuring at least two orthogonal electric field components for remote deployment in electromagnetic surveying, comprising:

(a) a frame;
(b) at least two pairs of electrodes, each electrode of a pair being attached to the frame by an arm, each arm extending from opposite sides of the frame to form a dipole, the at least two dipoles being disposed to be approximately orthogonal to each other;
(c) an attitude sensor mounted on the frame adapted to measure the three-dimensional angular orientation of the frame; and
(d) at least one positioning sensor located on or within each electrode arm.

The invention is also a method for determining electric field components in a pre-selected coordinate reference frame at water bottom locations in a controlled source survey of a subterranean region below a body of water, comprising:

(a) obtaining measurements of at least one electric field component made using at least one water bottom receiver having a dipole antenna for each component, each dipole antenna having two arms with an electrode attached to each arm, said component's direction depending on orientation of the receiver arms;

(b) obtaining measurements of receiver electrode position relative to the receiver's frame made using at least one positioning sensor located on each electrode arm of the receiver (c) estimating orientation angles of the electrode arms in the pre-selected reference frame using the electrode positions and known receiver frame orientation relative to the pre-selected reference frame; and (d) resolving the measured electric field into components in the pre-selected coordinate reference frame, using the orientation angles.

The invention is readily extendable to other autonomous survey devices including electromagnetic sources and ocean bottom seismic receivers.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

Figure 1:
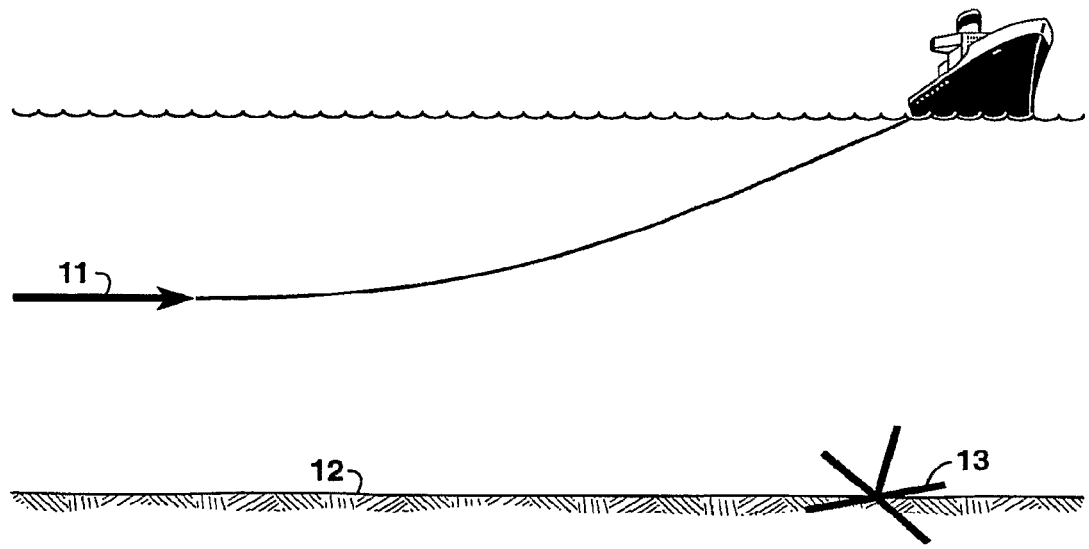
FIG. 1 illustrates a marine CSEM survey.
Figure 2:
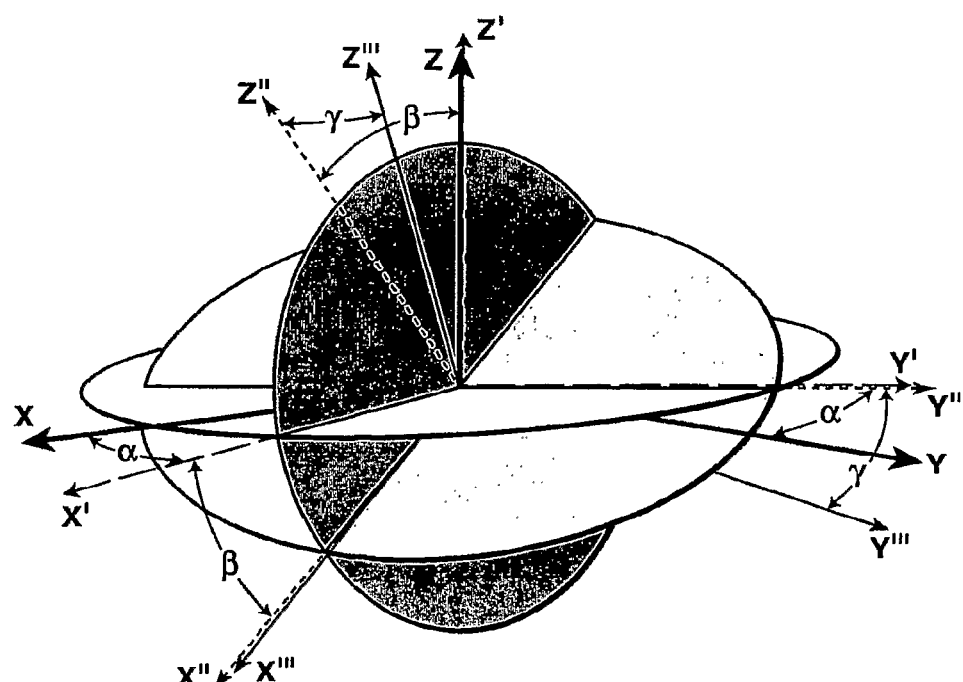
FIG. 2 defines a set of three angles relating orientation of one coordinate system to another.
Figure 3A:
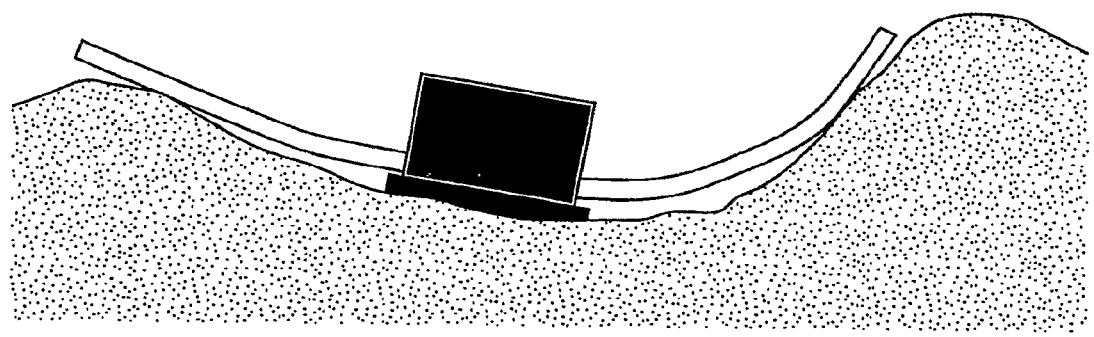
FIGS. 3A-B show a CSEM receiver with flexible (3A) and rigid (3B) horizontal arms.
Figure 3B:
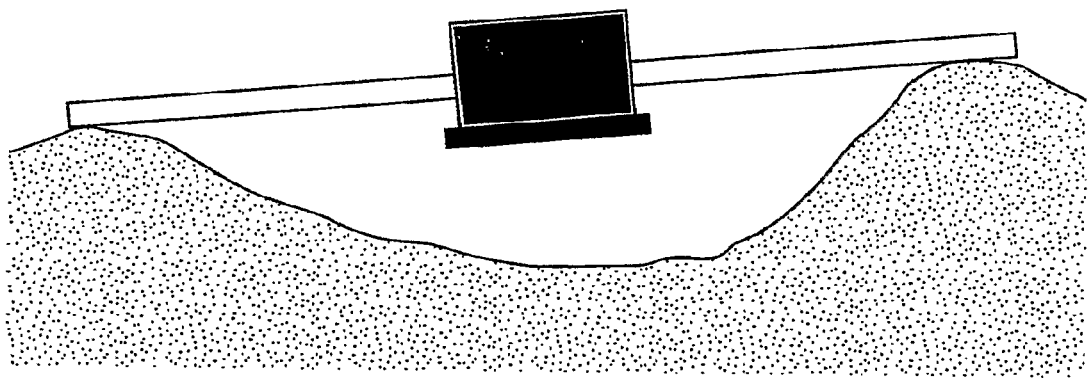
Figure 4:
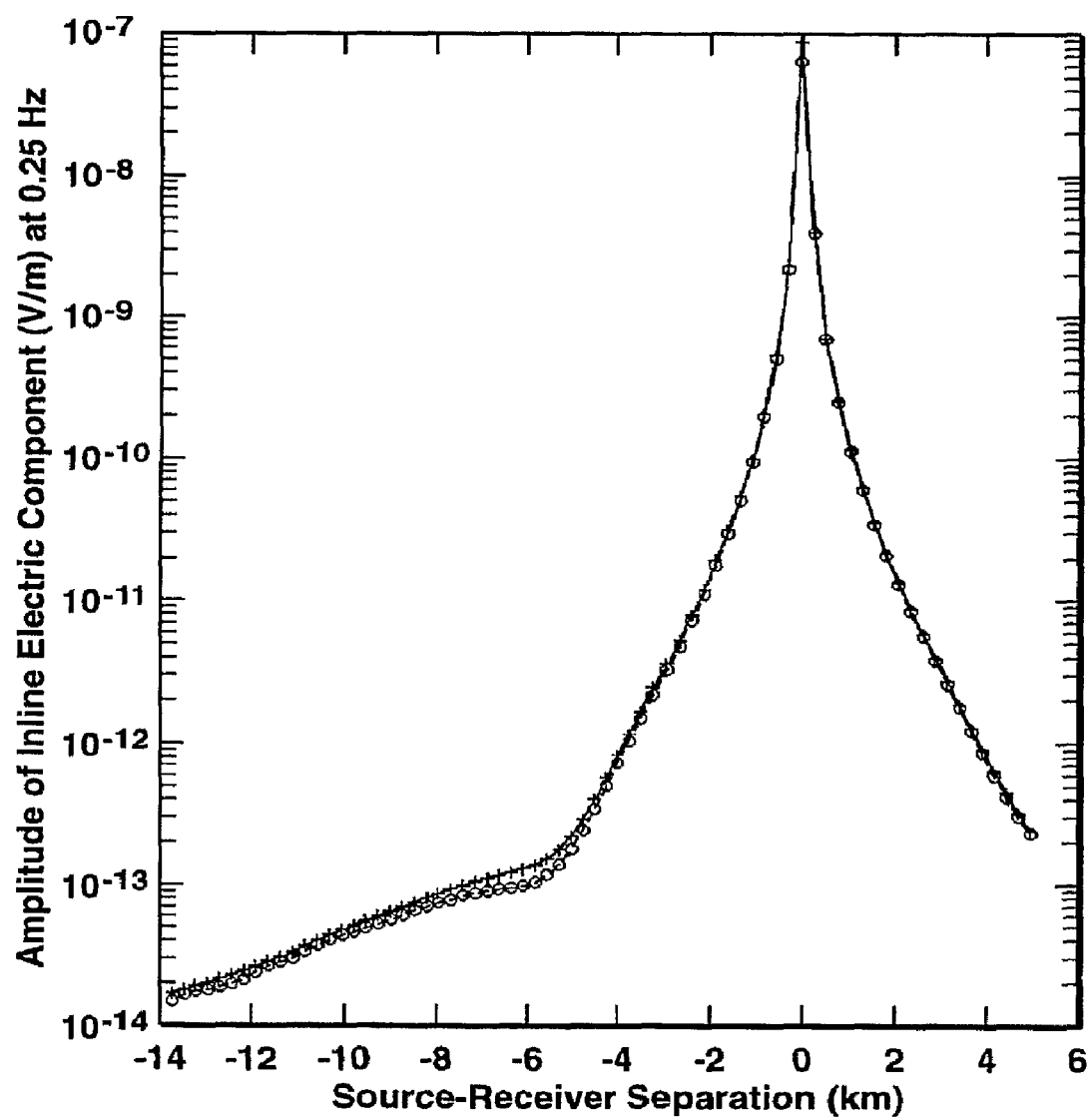
FIG. 4 shows effects of receiver orientations on the amplitude of the inline electric field component.
Figure 5:
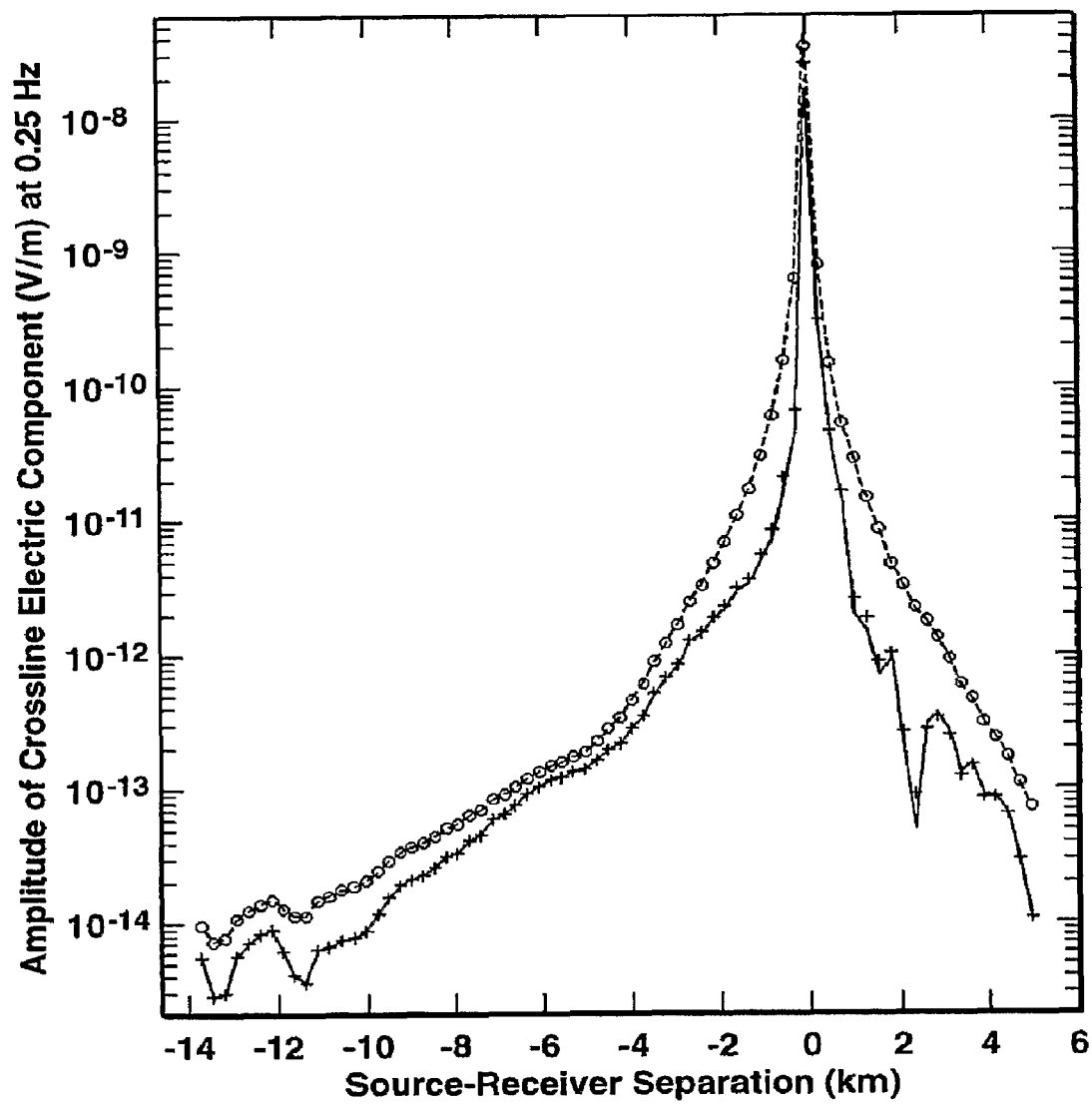
FIG. 5 shows effects of receiver orientations on the amplitude of the crossline electric field component.
Figure 6:
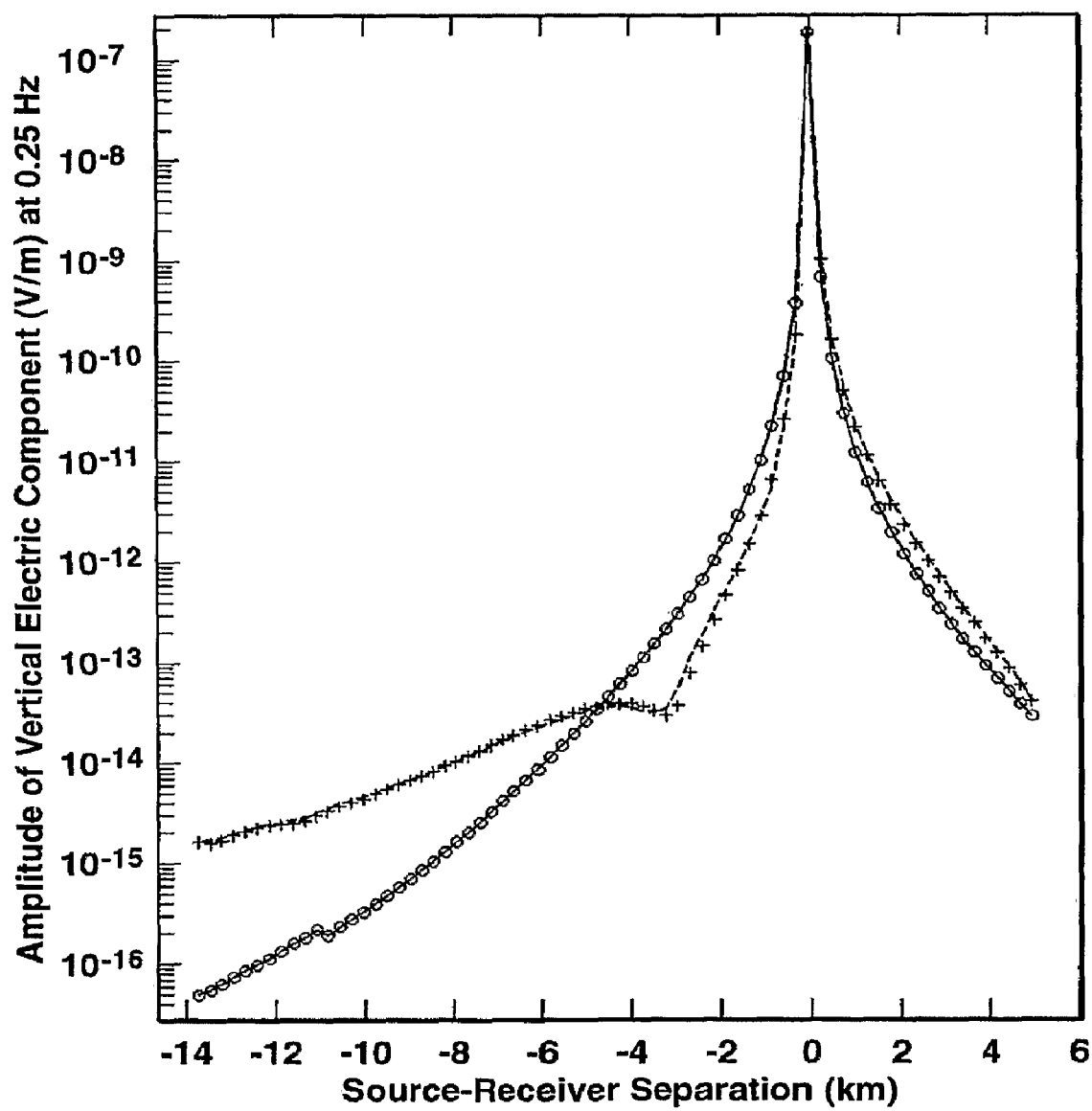
FIG. 6 shows effects of receiver orientations on the amplitude of the vertical electric field component.
Figure 7:
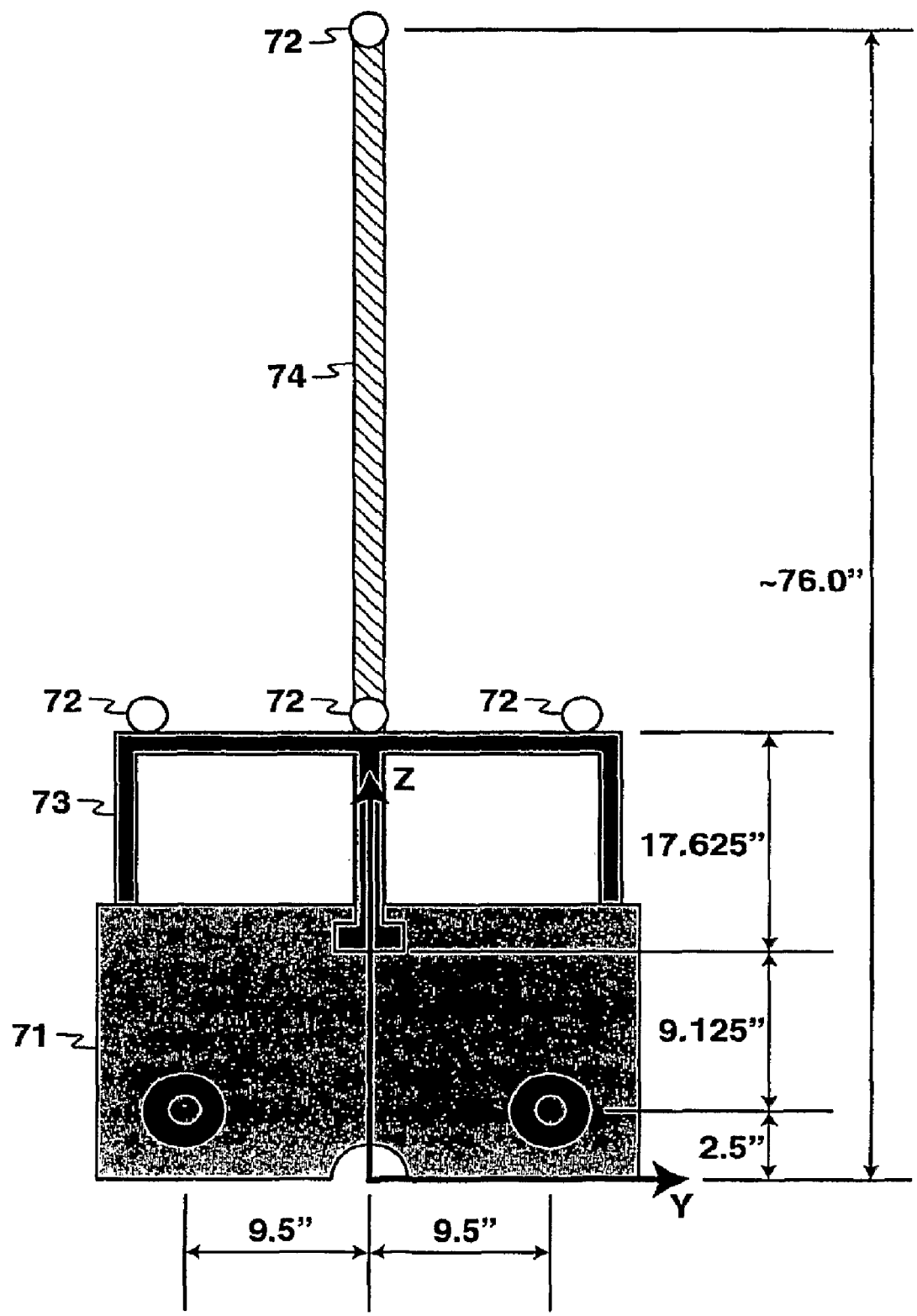
FIG. 7 is a vertical cross section of an EM receiver frame, showing possible transducer locations.
Figure 8:
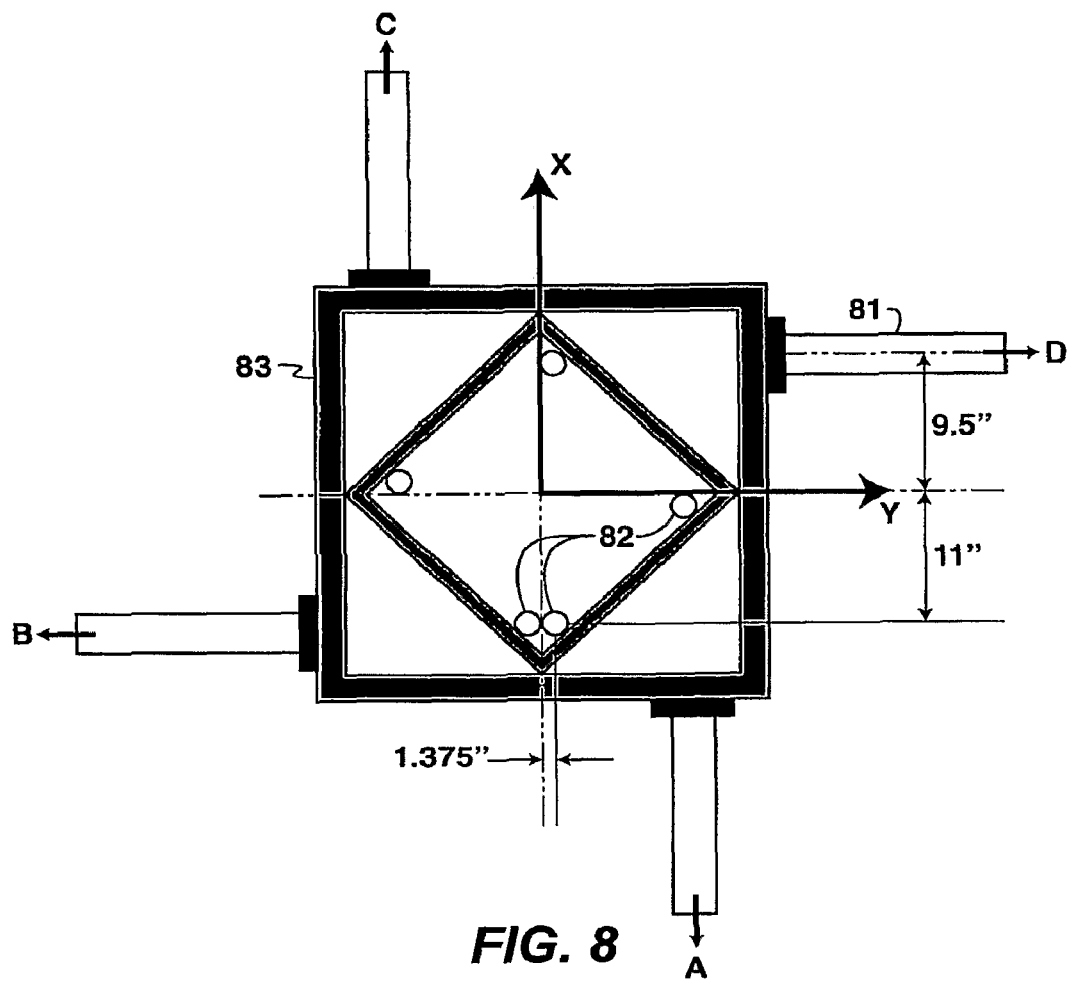
FIG. 8 is a plan view of a receiver frame, showing the horizontal electrode arms and possible transducer locations.

The present invention uses the EM receiver frame as a local body reference; the three-dimensional orientation of a dipole is estimated relative to the EM receiver frame. The EM receiver frame must be equipped with a suitable attitude sensor ($\alpha'$, $\beta'$ and $\gamma'$) and all local body offsets (dimensions between sensors, mounting points and the like) must be precisely known (preferably to within 1 mm precision) in order to perform the trigonometric calculations needed to solve for the dipole orientation angles from the measured quantities. A vertical cross section of an EM receiver frame 71 is shown in FIG. 7, with acoustic transducer locations 72 suitable for the acoustic ranging (LBL) embodiments of the present invention. An upper part of the frame 73 is called the bale and typically is made of stainless steel. The "flag pole" 74 provides a location for an out-of-plane sensor needed for range intersection embodiments of the invention. Actually, the sort of pole used in current receiver designs to hold a flag, which is used to aid visual identification when the receiver returns to the sea surface, lacks the rigidity required for LBL positioning. (CSEM receivers are autonomous devices, recording the data they measure, and needing to be found and recovered after the survey is finished.) Thus, the present invention requires a different pole for sensor mounting, or strengthening of the traditional flag pole. Other receiver configurations include a vertical dipole complete with electric field sensors. This dipole is typically sufficiently rigid to be used for a transponder location. As generally used herein, the term receiver frame will include such structural features as the bale and the flag pole, as well as other details deemed too minor in significance to be shown in the drawings. Dimensions shown are taken from an actual receiver frame, and represent merely one possible example. FIG. 8 shows a similar frame 83 in plan view. Five potential transducer locations 82 are shown. Four horizontal electrode arms 81 are shown. The arms are shown offset from the frame centerline, in opposite directions, as they exist in some actual receivers. Such offsets are not necessary. The arms are preferably flexible so as to avoid the situation depicted in FIG. 3B. CSEM or other autonomous seafloor receivers, with electrodes fixed to the end of long arms (i.e., dipoles), are for electric field measurements. Magnetic field measurements are typically made, in those few CSEM surveys that measure magnetic field components, by sensors that are rigidly mounted to the receiver frame, and thus have the same attitude as the frame, along with known mounting offsets.

An acoustic transducer is a particular type of acoustic sensor that can measure two-way travel time of an acoustic wave in a medium such as water, and then convert it into a distance using the velocity of sound in water and ray tracing techniques, a technique called range determination. In some embodiments of the present invention, a frame-mounted transducer interrogates another sensing device or means called a transponder, located on a dipole arm, by transmitting an acoustic wave that reaches the transponder. The transponder will reply with its own acoustic pulse, which is received by the transducer. This basic technique is known in connection with multiple transducers located on the seafloor, and is referred to as Long Baseline ("LBL") acoustics. However, acoustic transponders and transducers are essentially similar, and can both be referred to as acoustic sensors. Both can transmit and receive acoustic pulses. The main difference is in the number of elements. Some commercially available transducers have as many as 241 elements. Multiple elements are required to estimate angles through phase differences. For the present invention, transponders might be the preferred choice for sensors located on dipole arms or on the receiver frame, except in the USBL embodiment where a single transducer can replace multiple transponders on the frame. However, the devices are interchangeable for purposes of making the present invention work satisfactorily, and will collectively be referred to herein as acoustic sensors.

Another type of acoustic sensor is the responder. By contrast to a transponder, which is interrogated by an acoustic pulse, a responder is triggered by an electric pulse transmitted through a hard wire link. Both a transponder and responder will reply with an acoustic pulse that is received by the transducer. It is the return pulse that is used to generate the angular estimates in a USBL system (described below). The range estimate is computed from the two-way or one-way travel time when using a transponder or responder respectively. The power required by a responder may be supplied from a self contained battery or through the hard wire link.

Underwater acoustic equipment suitable for use in the present invention can be purchased from a variety of commercial manufacturers including Kongsberg Maritime (www:km.kongsberg.com), Sonardyne (www.sonardyne.co.uk), and Nautronix (www.nautronix.com).

Some embodiments of the present invention use attitude sensors instead of acoustic sensors. The attitude sensors of the present invention must be capable of measuring three independent angular coordinates that uniquely specify the orientation of a Cartesian coordinate system (and a related object) in space, i.e., azimuth, pitch and roll. As stated above, the invention works on the principle that the dipole orientation is measured relative to the receiver frame's orientation, which must itself be measured by at least one frame-mounted attitude sensor to provide absolute orientation of the dipole arms when the sensor data are processed. Processing could be performed by a computer module located in the receiver frame, but that would provide little advantage, and therefore processing will typically be deferred until the receiver is recovered and the data can be conveniently downloaded. Attitude sensors require a power source, as do acoustic sensors. In either case, the sensor may include self-contained batteries or may receive power through a cable from a central source.

Attitude sensors do not measure the desired orientation angles directly. Attitude sensors do in fact measure orientation angles directly, but the sensor's reference frame deviates from either receiver or dipole reference frames as the horizontal arms flex. In the processing of these data, a suitable continuous shape is fitted to the attitude measurements to estimate a three-dimensional dipole arm profile. A two-dimensional equivalent would be the streamer shaping performed using compass observations on marine seismic surveys. There are several commercially available sensors that are suitable for this application. The main selection criteria are small compact size, low weight and low power compensation. One such suitable sensor is the Honeywell HMR3300 Digital Compass available from Solid State Electronics Center, Honeywell, 12001 State Highway 55, Plymouth, Minn., 55441. Honeywell also makes a model HMR3000. The HMR3300 is a smaller and lighter unit than the HMR3000. The HMR3300 measures 1.45"×1.00"×0.44" and weighs 7.5 g. The HMR3000 measures 4.00"×1.50"×0.97" and weighs 92 g. The smaller physical dimensions will reduce the size and weight of the associated pressure housing. Such commercially available attitude sensors would need to be repackaged in a pressure vessel to withstand the pressures associated with deep-water deployments. This has been successfully done by the present inventors, and is straightforward The term positioning sensor will be used herein to embrace other sensors such as attitude sensors that may be used in the present invention besides acoustic sensors; i.e. positioning sensor includes attitude sensors and acoustic sensors.

The present invention addresses the problem of knowing dipole attitude as a function of time, so a clock is required. The clock may be the same clock used to time the electric field arrivals at the electrodes, i.e., the CSEM survey data. The survey data requires very precise timing, which is not needed for attitude monitoring. A separate clock could be used for the attitude monitoring of the present invention. If a receiver were to be designed and constructed according to the present invention, it might be preferable (but not essential) to design it such that the attitude sensors and the electric field sensors share common elements such as power supply, control electronics and data storage. If an existing receiver is to be retrofitted with the attitude determination features of the present invention, it might be preferable (but not essential) to duplicate these required components in a separate pressure housing. The separate housing approach might also be advantageous from the standpoint of minimizing electrical noise or interference with the highly sensitive EM receiver circuitry. Such an autonomous control unit would be housed in a suitably rated pressure vessel and preferably mounted on the receiver frame. The control unit might include a data acquisition module, power and recordable media. The present invention includes both retrofitted and original design receivers.

Acoustic transducers and transponders complete with a suitably rated pressure vessel can be purchased from commercial suppliers. However, most commercially available transponders are designed for long deployments (quiescent times ranging from 20 to 600+ days) in deep water. The acoustic ray path between the transponder and a surface vessel can exceed 3,000 meters These transponders are typically large (300 to 1,000+ mm in length) and heavy (2 to 60 Kgs in air) and would not be suitable for deployment at the ends of the dipole arms. A product that is suitable is called SHARPS (Sonic High Accuracy Ranging and Positioning System), and is available from Marine Sonic Technology, Ltd., 5508 George Washington Memorial Highway, P.O. Box 730, White Marsh, Va., 23183-730.

Five alternative embodiments of the invention will now be described. In the drawings illustrating the different embodiments, common features may use the same reference number.

Shape Fitting

Figure 9:
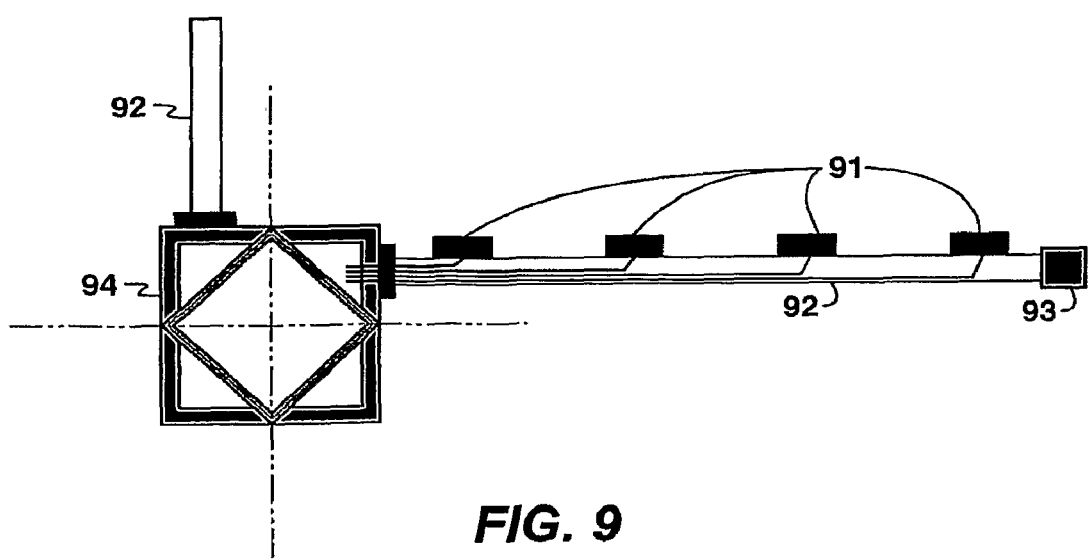
FIG. 9 is a plan view of a receiver frame and two electrode dipole arms (not to scale), illustrating sensor configuration for a shape-fitting embodiment of the present invention.

Three-dimensional attitude sensors (91 in FIG. 9) are deployed at discrete points along the horizontal arms 92. Only two electrode dipole arms are shown (not to scale) in the drawing. 93 indicates the location of the electric field sensor (electrode) on each arm. The receiver frame is 94. Each attitude sensor measures the three orientation angles, typically called azimuth, pitch and roll. The continuous shape of the arm can be determined at any time by fitting a polynomial curve through the discrete data points provided by the attitude sensors. The attitude sensors thus provide the 3D slope of the tangent to the curve of the electrode arm at known distance intervals along the arm. Each attitude sensor can take the form of a compass and tilt sensors, or a Micro-Electro-Mechanical Inertial Navigation System (MEMS INS), or any equivalent sensing means or device. A compass/tilt sensor suitable for the present invention is the previously mentioned Honeywell HMR3300 Digital Compass. Potential MEMS sensors include the Crista Inertial Measurement Unit which uses MEMS gyroscopic rate sensors and accelerometers. The unit is available from Cloud Cap Technology, Inc., P.O. Box 1500, 2621 Wasco Street, Hood River, Oreg., 97031. An alternate sensor is the "nIMU" which uses triaxial angular rate and acceleration sensors. The unit is available from MEMSense, LLC, 2693D Commerce Road, Rapid City, S.D., 57702. Software to process the data from the attitude sensors will be similar to the software used for marine seismic streamer data acquisition, where similar curve fitting is routinely used to estimate the horizontal profile of the streamer from compass observations. One example is SPECTRA, an integrated navigation and survey control system for towed streamer seismic acquisition, developed by Concept Systems Limited, 1 Logie Mill, Beaverbank Business Park, Logie Green Road, Edinburgh EH7 4HG, Scotland, UK. Extension of the seismic streamer approach to include the pitch observations of a 3D attitude sensor will be a straightforward exercise. FIG. 9 shows the electrical communication between the attitude sensors and a central control unit (not shown) inside the frame including a clock and data recording/storage capability. At least two attitude sensors are needed to provide some indication of the shape of a flexible arm. One sensor should be mounted at the end of the arm, close to the electrode. The receiver frame mounted attitude sensor (not shown) can provide the second set of data points. A denser distribution of sensors 91 on each arm will enable more complex shapes to be estimated. This embodiment of the invention has physical limitations in that additional hardware must be attached to each arm at several discrete points, each with power and data logging requirements. In this one embodiment of the invention, the positioning sensors provide essentially (even attitude sensor data requires some processing) direct measurement of the attitude of the dipole arms.

Acoustic Ranging (LBL)

Figure 10A:
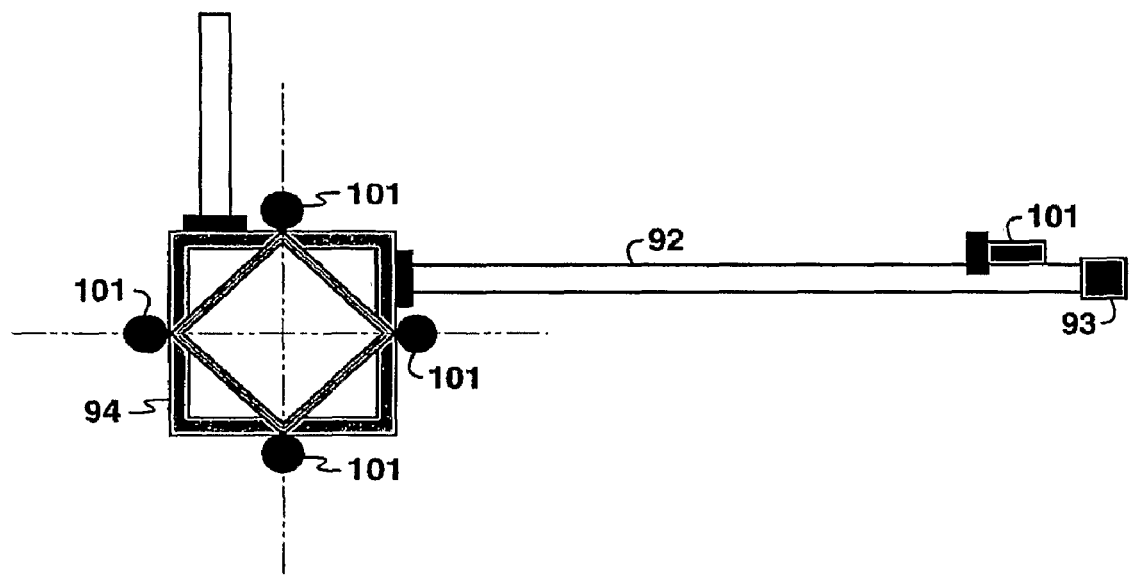
FIG. 10A is a plan view of a receiver frame and two electrode dipole arms (not to scale), illustrating sensor configuration for an acoustic ranging (LBL) embodiment of the present invention.
Figure 10B:
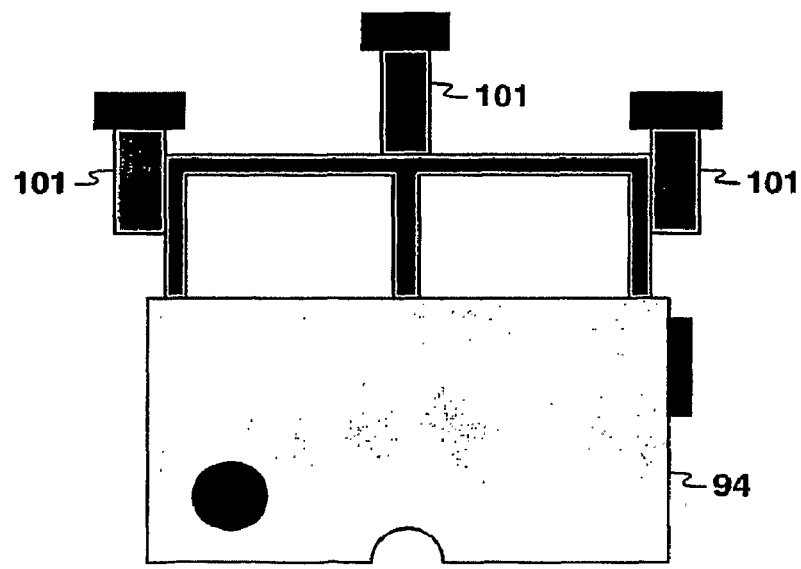
FIG. 10B shows a side elevation view.

In this embodiment illustrated in FIGS. 10A-B, a local Long BaseLine (LBL) acoustic network is established with acoustic transponders 101 mounted on the EM receiver frame and at the end of each horizontal arm close to the electrode. The transponders mounted on the receiver frame are preferably arranged with at least one transponder out of plane (one possible configuration illustrated in side view in FIG. 10B) to ensure a three-dimensional solution. An obvious out of plane location is on top of a vertical arm such as the flagpole in FIG. 7. Actually, the geometrical requirement is that one of the minimally necessary four acoustic sensors—the at least three frame-mounted transponders and the transponder or responder located on the arm near the electrode—must be out of plane. Rather than rely on the electrode sensor to be out of a plane containing all frame-mounted transponders, it may be preferable to place one frame transponder clearly out of the plane defined by the other two frame transponders and the electrode sensor. The electrode positions are estimated using range intersection from the multiple frame based transponders. Hardware for LBL is described in more detail in *Dynamic Positioning of Offshore Vessels*, by Max J. Morgan, 1978, ISBN 0-87814-044-1, PPC Book Division, The Petroleum Publishing Co. (1978). The principles of LBL are presented in *Hydrography* by C. D. de Jong, G. Lachapelle, S. Skene and I. A. Elema, ISBN 90-407-2359-1, DUP Blue Print, Delft University Press (2002). These acoustic transponders can be operated in a variety of modes; single range, multiple simultaneous ranges from the arm to all transponders on the frame, or responder mode. At least three frame-based transponders and at least one transponder per arm are needed for this embodiment. A fourth frame-based transponder will allow the software to perform blunder detection and outlier rejection. The transponder shown in FIG. 10A located at the end of the arm near the electrode points toward the receiver frame and can be powered by a self-contained battery or by cable from a central control unit in the frame (not shown). The frame-based transponders will typically be connected to the central control unit for power and communications purposes.

The sensor 101 mounted on the electrode arm in FIG. 10A could be another type of acoustic sensor called a responder. A responder is connected to a central control unit located in the receiver frame via a conductor wire. An electric pulse transmitted through the wire replaces the acoustic trigger (from the transducer). The responder will then reply with an acoustic pulse that is sensed by the transducer.

The receiver frame dimensions are typically small compared with the horizontal arm (approximately 1 meter square versus approximately 5 meters). (It is not the purpose of the present invention to require certain receiver designs or dimensions as regards frame, dipole arms, and similar features that any CSEM receiver must have. Instead, the teachings of the present invention can be implemented, if so desired, by retrofitting sensors to various possible locations on existing receivers.) The geometrical intersection of acoustic ranges from such a small baseline can result in significant positional uncertainty. This uncertainty is reduced by using high frequency (500 kHz or higher) acoustics which provide improved range precision (a few millimeters). Network pre-analysis indicates three-dimensional orientations to better than 1 degree (95% confidence level, three-dimensions) are achievable.

A Long BaseLine (LBL) acoustic network is deployed with transducers (or other acoustic sensors) mounted on the receiver frame and at or substantially at the ends of the horizontal electrodes. The exact location of the frame-mounted transducers will be specific to the receiver design. One possible configuration is shown in FIGS. 7 and 8. The transducers mounted at the ends of the arms (see FIG. 10A) will operate in a responder mode in a preferred embodiment of the invention, where the electrical trigger signal and power are transmitted along a cable from a main control unit (not shown).

The 3-dimensional coordinates estimated by the LBL technique will be relative to the receiver frame. There must be an attitude sensor mounted on the receiver frame (as in other embodiments of the invention) to provide the orientation of the frame. The LBL coordinates must be rotated by the receiver frame orientation during the calculation of absolute dipole orientations.

Acoustic Positioning (USBL)

Figure 11A:
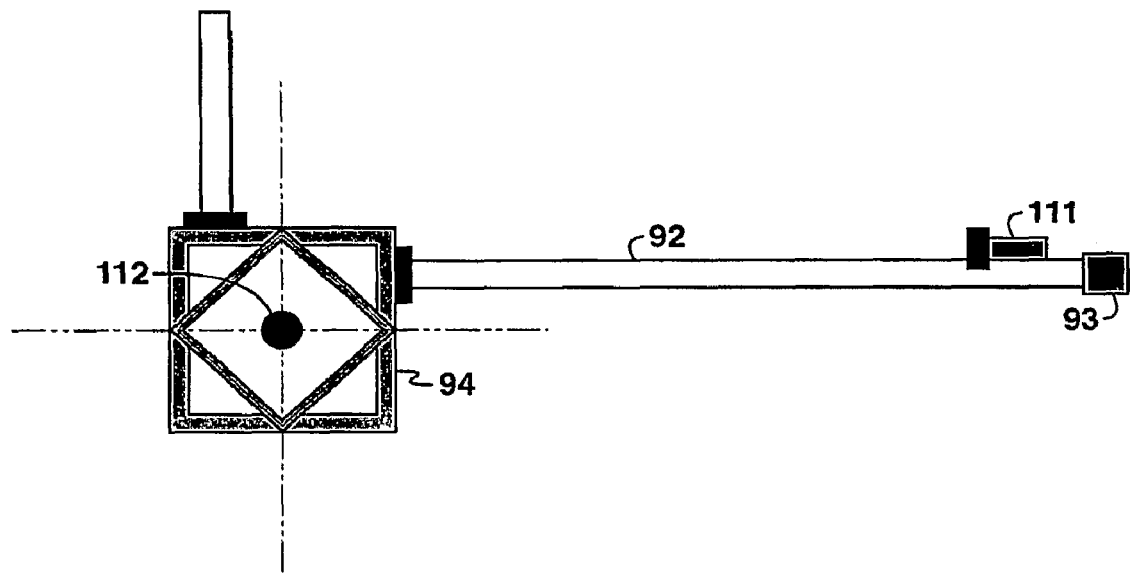
FIG. 11A is a plan view of a receiver frame and two electrode dipole arms (not to scale), illustrating sensor configuration for an acoustic positioning (USBL) embodiment of the present invention.
Figure 11B:
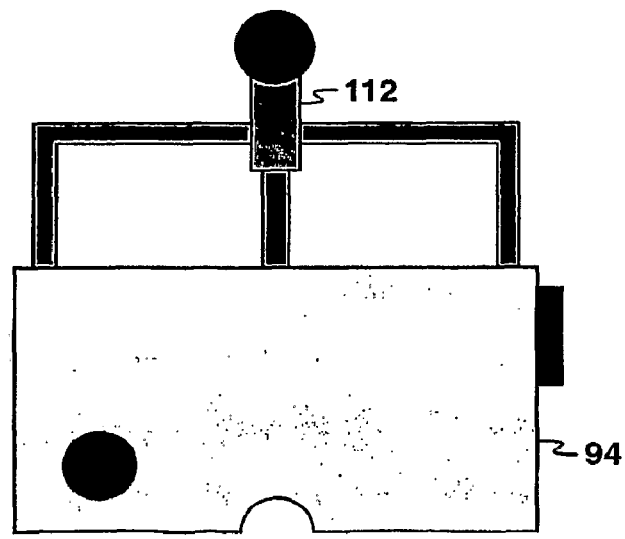
FIG. 11B shows a side elevation view.

Ultra Short BaseLine (USBL) acoustic positioning systems measure a range plus horizontal and vertical angles (relative to a local reference frame) which provide a unique three-dimensional position of a remote transponder, and hence of the electrode located close to it. For details about how a USBL system works, and how the data are processed, see, for example, *APOS for the HiPAP System Instruction Manual—Base Version* available from Kongsberg Maritime AS, Strandpromenaden 50, P.O. Box 111, N-3191 Horten, Norway, and the previously referenced work *Hydrography* by C. D. de Jong, et al. Such systems are presently deployed on surface vessels to track remote subsea targets, with maximum ranges of 4,000 meters or higher. Typical acoustic frequencies range between 10 and 30 kHz, which provide long range propagation, but with reduced range resolution. FIG. 11A shows an acoustic transponder 111 located near the electrode 93 on a dipole arm 92, pointing to the receiver frame 94. The transponder is triggered by an acoustic transducer 112, shown also in a side view in FIG. 11B. The transducer is shown elevated in FIG. 11B to provide a clear line of sight between the transducer and the various transponders. Transducer 112 measures the range and two spherical coordinate angles to transponder 111. The angles measured from the USBL transducer to the transponder might be termed indirect measurements; they can be used to estimate the dipole attitude but do not measure the attitude directly, as is the case with an attitude sensor. The USBL angles are relative to an arbitrary reference frame on the receiver body and need additional processing to provide a dipole attitude estimate. Alternatively, the electrode sensor may be a responder, hard wire connected to the frame transducer.

Thus, the USBL array provides $(r, \theta, \Phi)$ spherical coordinates for the position of the electrode transponder, relative to a reference frame fixed to the receiver frame. To do this, the USBL transducer must have three elements, configured in a mutually orthogonal array. Obviously such a sensor has a functional equivalent in the form of three independent (single element) transducers configured mutually orthogonally. A receiver mounted attitude sensor must provide the orientation of the frame. The angles estimated by the USBL and the receiver's attitude sensor must be combined to provide the absolute dipole orientation.

A possible embodiment of the present invention would include a USBL system designed with high frequency elements, where the transducer could withstand the pressure associated with deep water (6,000 meter) deployment. Higher frequencies provide more precise range and angular resolutions, but suffer greater signal attenuation, which limits their range. Deep-water rated USBL transducers may not be presently available from commercial suppliers due to limited demand in the market place.

Acoustic Imaging (Sonar)

In a generic sense, MultiBeam EchoSounders (MBES) work in a similar manner to USBL systems. Namely an acoustic pulse is transmitted and the returned signal is detected by a transducer. The return signal is generated by the back scatter of the transmitted signal off the seafloor. The transducer is comprised of segments which allow the system to estimate angles over a "swath". A range estimate is derived from the two way travel time, velocity of sound profile and ray tracing as appropriate, as explained in *Hydrography* by C. D. de Jong, et al. MBES systems are 2-dimensional with the beams being transmitted in a vertical plane from the transducer. A 3-dimensional image is constructed as the transducer moves forward on a surface vessel, deep tow fish or ROV. There are multiple systems commercially available: A system suitable for surface vessel deployment is the Kongsberg EM710 (High resolution seabed mapping system). The EM710 is available from Kongsberg Maritime AS. A MBES will provide a direct measure of the dipole orientation relative to the receiver frame. The absolute orientation can be computed by combining the relative orientation with the receiver frame attitude (as in the Shape Fitting embodiment). MBES transducers do not provide hemispheric coverage. As such, multiple transducers need to be mounted on the receiver frame to illuminate each dipole arm. Further transducers need to be mounted in an orthogonal direction to provide full 3-dimensional coordinates. Each sonar transducer will provide a range and bearing. Two transducers are typically mounted in a T formation, which will provide angular information in two perpendicular axes. The two angles and a range will provide a 3-dimensional position estimate. A suitable reflector mounted at the end of each dipole will enhance the returned signal.

High resolution acoustic images can be generated using sonars with acoustic lens in place of conventional beam forming electronics previously discussed (Belcher, E. O. et al "Beamforming and imaging with acoustic lenses in small, high-frequency sonars", presented at Oceans '99 Conference, 13-16 Sep. 1999, Seattle, Wash.). One commercially available system is the Dual frequency IDentification SONar (DIDSON) which has a quoted horizontal beamwidth of 0.4°. A variation of this system is capable of operation to approximately 2,500 meters The DIDSON system is available from Applied Physics Laboratory, University of Washington, 1013 NE 40th Street, Seattle, Wash. 98105.

Any other acoustic imaging technique that is capable of estimating a range and bearing of a reflector at the end of the dipole arm relative to the receiver frame can also be used in this embodiment of the invention, including interferometric side scan sonar.

Fiber Optic Shape Determination

Fiber Bragg Gratings (FBGs) consist of a series of perturbations in the index of refraction along the length of a fiber. A typical grating may be between 1 and 25 mm in length, and the spacing between regions of alternating refractive index may be measured in hundreds of nanometers. The grating reflects a spectral peak based on the grating spacing and wavelength of reflected light. The physics and the analysis are very similar to that for a diffraction grating in a physics textbook. Diffraction gratings and their resulting diffraction patterns are explained by a simple relationship that explains each observed diffraction peak by relating the grating "slit" spacing, the order of the peak, the angle of diffraction, and the wavelength of the light causing that peak. For the diffraction grating, the slit spacing is a known constant quantity. For the present application, the flexing of the antenna arm and consequent flexing of the optical fibers changes grating dimensions that correspond to slit spacing, which become the unknowns in the calculation while the source frequency remains constant. (The optical fiber applications of the present invention utilize reflection patterns, not diffraction patterns.) The shape of the arm can be estimated from the change in grating dimensions. Quantitative strain measurements can be made by measuring the center wavelength of the reflected spectral peak (W. L. Schutz, J. P. Conte, E. Udd, "Long Gage Fiber Optic Bragg Grating Strain Sensors to Monitor Civil Structure," Proceedings, SPIE 4330, 56-65, *Smart Structures and Materials* 2001: *Smart Systems for Bridges, Structures, and Highways;* Ed. Liu, S. C. (2001)). A commercial Fiber Optic Bragg Gratings strain measuring product is the Distributed Sensing System (DSS) marketed by Luna Innovations, 10 South Jefferson Street, Roanoke, Va. 24011. A commercial source of Fiber Bragg grating sensors complete with a rugged housing to protect from the physical and environmental harm is Advanced Engineering Development Program (AEDP), 4865 Walden Lane, Lanham, Md. 20706. AEDP have deployed Fiber Bragg grating on a submarine hull exterior for vehicle certification.

Multiple Fiber Bragg Gratings can be constructed over the length of a single fiber. The gratings can be interrogated using either Wavelength Division Multiplexing (WDM) or Optical Frequency-Domain Reflectometry (OFDR) to provide multiple spectra along a single fiber. OFDR can estimate spectra at a higher spatial density and to a higher resolution. As stated previously, Fiber Bragg Gratings have been used in civil and structural engineering applications. The equipment for such applications will need repackaging for sub-sea pressure vessels before being usable in the present invention, but this should be straightforward.

Figure 12:
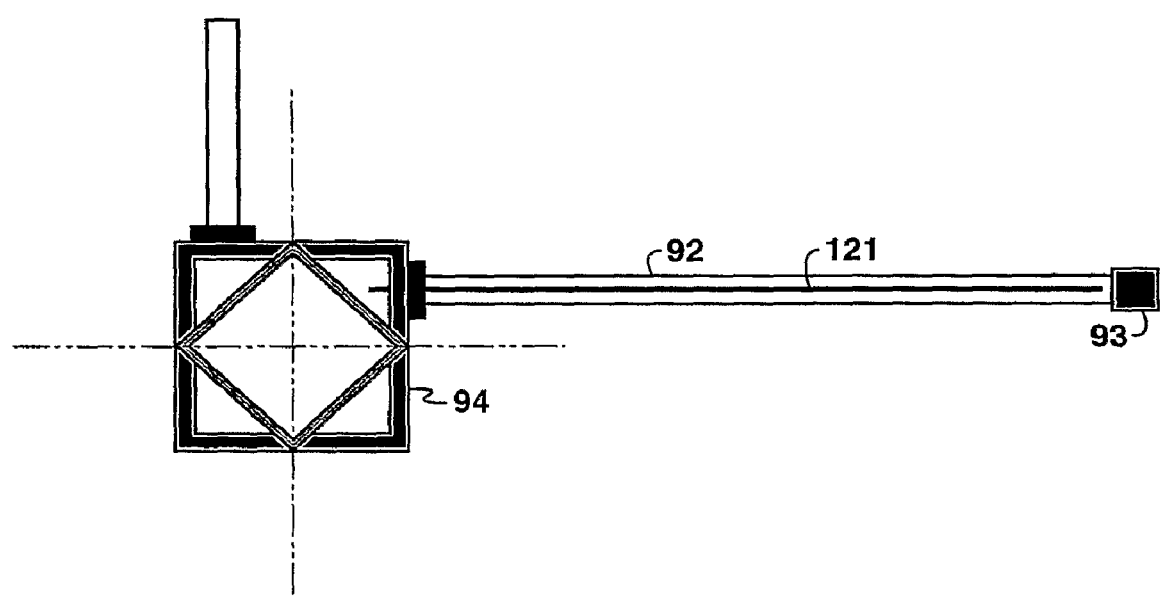
FIG. 12 is a plan view of a receiver frame and two electrode dipole arms (not to scale), illustrating sensor configuration for fiber optic cable embodiments of the present invention.

As stated above, multiple FBGs can be deployed along a single fiber to detect strains at multiple points along that fiber, using a suitable multiplexing scheme. A single fiber can detect strains caused by the arm flexing. To estimate the shape of the horizontal arm, multiple fibers can be arranged on different faces or edges of the arm (ie top, bottom, left and right). A configuration of multiple fibers assembled in a single fiber is disclosed in "Sensing Shape," by Roger Duncan, published on pages 18-21 in the September 2005 edition of *oemagazine* (The SPIE magazine of Photonics Technologies and Applications), 17 Old Nashua Rd., Suite 25, Amherst, N.H. 03031. FIG. 12 shows the basic configuration for the FBG embodiment of the present invention, showing a single cable 121 running the length of the electric field arm 92. Power and communications connections to a central control unit located inside the frame 94 are not shown. The "Sensing Shape" article describes tests where the cable was positioned into circles, sinusoids plus sharp and gradual curves. Application in the present invention will result in gradual curves only. The quoted positioning error is ≈1.2% of the total cable length for all shapes. Over a dipole arm length of 5.0 meters, this equates to ≈6 cm error. If a worst case is assumed in which the error is perpendicular to the dipole, this will result in an angular error of $0.68°$ over the length of a single arm, or $\sqrt{(0.68^2+0.68^2)} \approx 0.97°(1\sigma)$ over two arms forming the dipole. See the discussion of FIG. 13B below for further perspective on this amount of electrode positioning error. This technology would need to be housed inside a pressure vessel/housing suitable for deep water operation. A central control unit would supply power, data storage and control for several cables, one deployed on each dipole arm.

Multiple Fiber Optic Sensors

U.S. Pat. No. 6,888,623 to Clements describes a flexible "smart cable" which consists of multiple optical fibers positioned close enough to cause cross-talk (mode coupling) between fibers over the length of the cable. Cross-talk is very sensitive to the distribution of strains caused by either curvature or torsion, which are used to infer the position and attitude of one end of the cable relative to the other. Each fiber is sequentially illuminated by a broadband source. Spectral intensities can be measured at different frequencies on all fibers. The local curvature and torsion can be estimated along the fibers which in turn allow the end points position and orientation to be estimated from the spectral intensity measurements. Using FIG. 12 to illustrate again, a single "smart" fiber-optic cable 121 is routed along or inside the dipole arm, and is connected to a control unit in the frame. Preferred versions of any of the fiber optic embodiments of the present invention include mitigation measures to minimize the effects of instrument noise, systematic biases due to fabrication defects and sensitivity to extrinsic variables including temperature. The smart cable is expected to be available soon as a commercial product from Dynamics Technology, Inc. or from Applied Signal Technology, Inc., Corporate Headquarters, 400 West California Avenue, Sunnyvale, Calif. 94086.

Both the FBG and the smart cable embodiments of the invention operate in a similar manner. The light-transmitting fibers are attached to each dipole arm. As the dipole arms bend, the fibers will be subjected to strain. Strains estimated along the fiber are used to estimate the curvature along the fiber. The instantaneous shape of the arm can then be estimated from the curvature at known discrete points along the arm (in much the same way as in the previously discussed shape fitting embodiment). The light-transmitting fibers are the arm positioning sensors in these last two embodiments of the invention, corresponding to the acoustic sensors or attitude sensors in other embodiments. All of these sensors will collectively be referred to herein as positioning sensors.

Simulated Tests

Figure 13A:
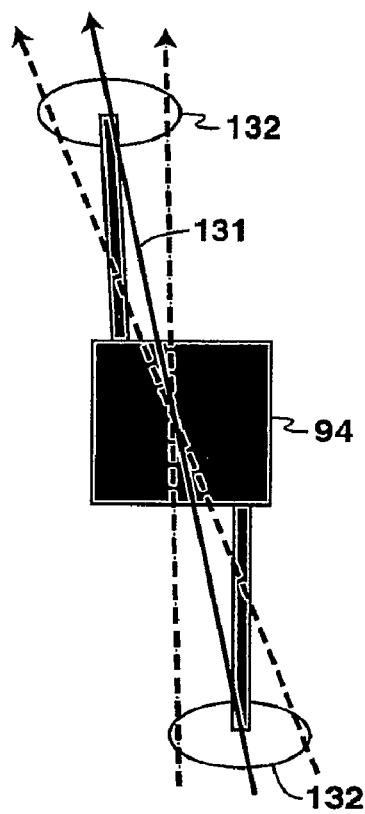
FIGS. 13A and 13B illustrate dipole azimuth uncertainty estimated from two independent electrode positions.
Figure 13B:
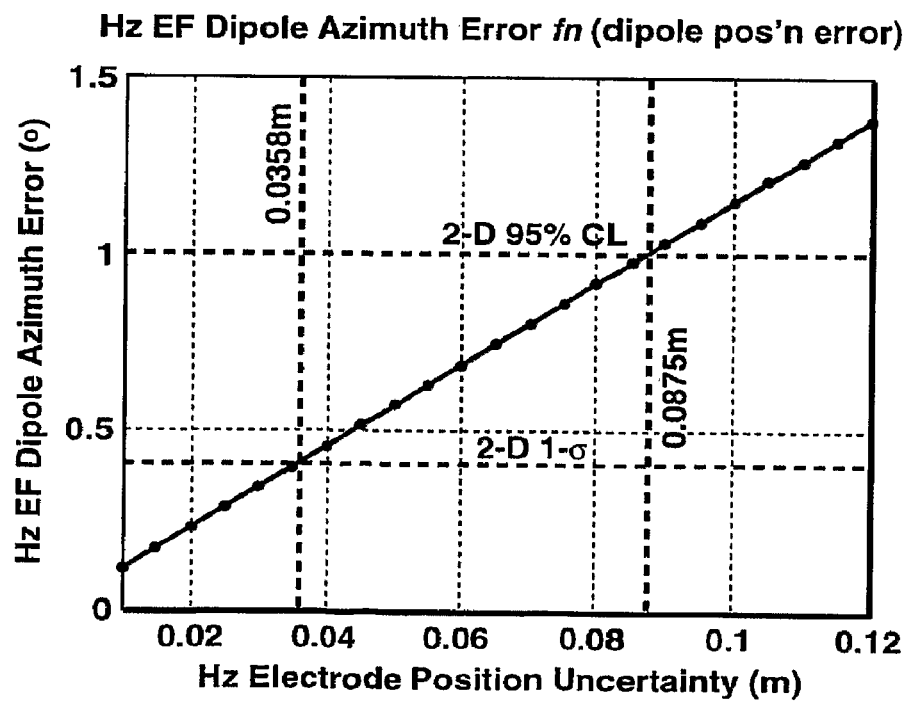

A reasonable expectation for target precision for the dipole attitude angles is ±1° (95% confidence level, or "CL") in both the horizontal and vertical planes. The precision of the 3-dimensional attitude ($\alpha$, $\beta$ and $\gamma$) is dependent on the precision of the positions of the two opposite electrodes (either A and C or B and D as shown in FIG. 8). Simulated tests based on one specific receiver design were conducted using the acoustic ranging (LBL) embodiment of the present invention. Simulations indicate acoustic ranges with uncertainties less than 0.003 m (3 mm) are required to estimate the dipole azimuth ($\alpha$) to <1° (95% CL). The azimuth $\alpha$ is a two-dimensional quantity, such that 95% CL=$2.447\sigma$, or $1\sigma<0.409°$. $\alpha$ is dependent on the horizontal positions of two opposite electrodes (A and C, or B and D, in FIG. 8). Each electrode must be positioned with a semi-major error <0.0358 m to satisfy $\alpha<0.409°$ ($1\sigma$), as shown in FIG. 13B. The angular uncertainty for the dipole azimuth 131 (uncertainty bracketed by the dashed lines) in FIG. 13A depends upon the electrode position uncertainty, indicated by the ovals 132; the azimuth uncertainty decreases as the electrode position uncertainty decreases (also reflected by FIG. 13B).

Figure 14:
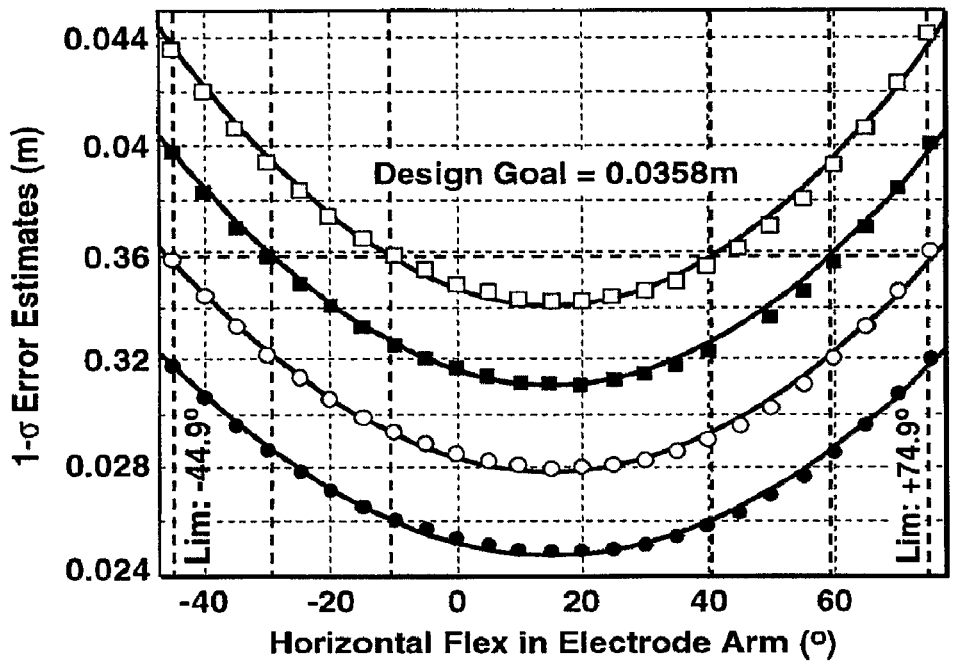
FIG. 14 shows precision of 5 m electrode positions based on simulated acoustic ranging at different acoustic range precisions, as a function of varying horizontal (azimuth) flex in the electrode arm.
Figure 15:
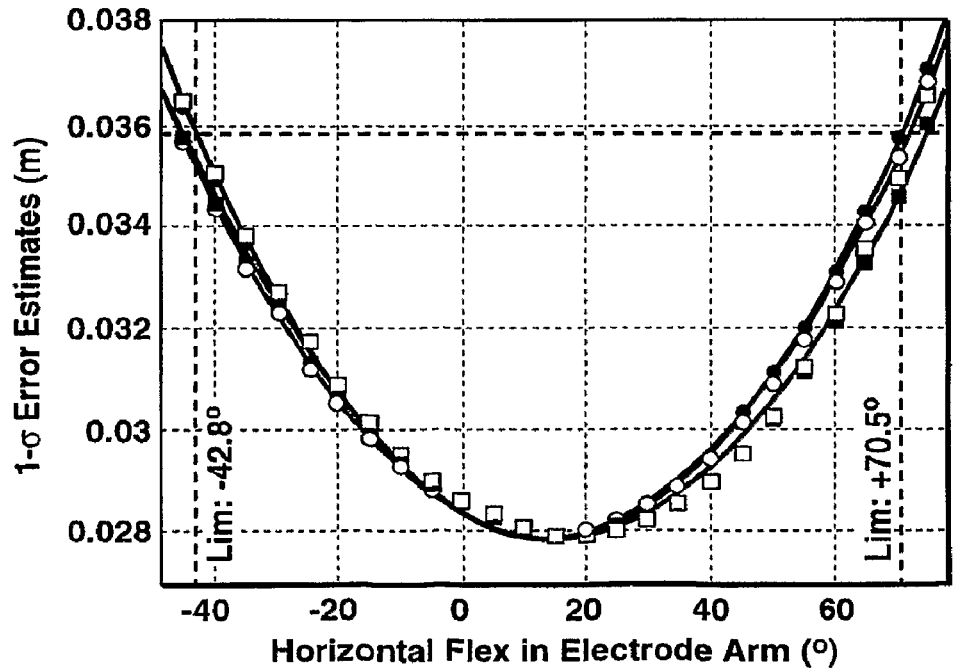
FIG. 15 shows simulated results for the same variables as in FIG. 14, showing all four horizontal-plane electrode arms for a single acoustic range precision.

Other simulations were performed in which the horizontal positions of the electrodes were varied in an arc around their mounting point in the receiver frame to learn what degree of precision in acoustic range measurement is needed to meet a design goal of ±35.8 mm in the electrode position over a range of $\alpha$ values, i.e. as the horizontal flex in the electrode arm is varied. The results are illustrated in FIG. 14. The four curves in FIG. 14 represent four different acoustic range precisions—from top to bottom, $\sigma$ is, in order: 2.75; 2,50; 2,25; and 2.00 mm. The dashed line indicates the design goal of 35.8 mm. An acoustic range precision of 0.00225 m (2.25 mm) ($1\sigma$) was selected (the precision depends on the frequency of the acoustic pulses), which provides an operational envelope of $-44.9°<\alpha(1\sigma)<+74.9°$. The simulation was repeated for the other three horizontal arm electrodes, at the selected acoustic range precision of 2.25 mm, and the results for each of the four arms are shown by the four curves in FIG. 15. The slight variations between the curves are due to the different geometrical constraints provided by the transducers 72 mounted on the receiver frame (FIG. 7). The operational envelope is reduced to $-42.8°<\alpha(1\sigma)<+70.5°$.

Figure 16:
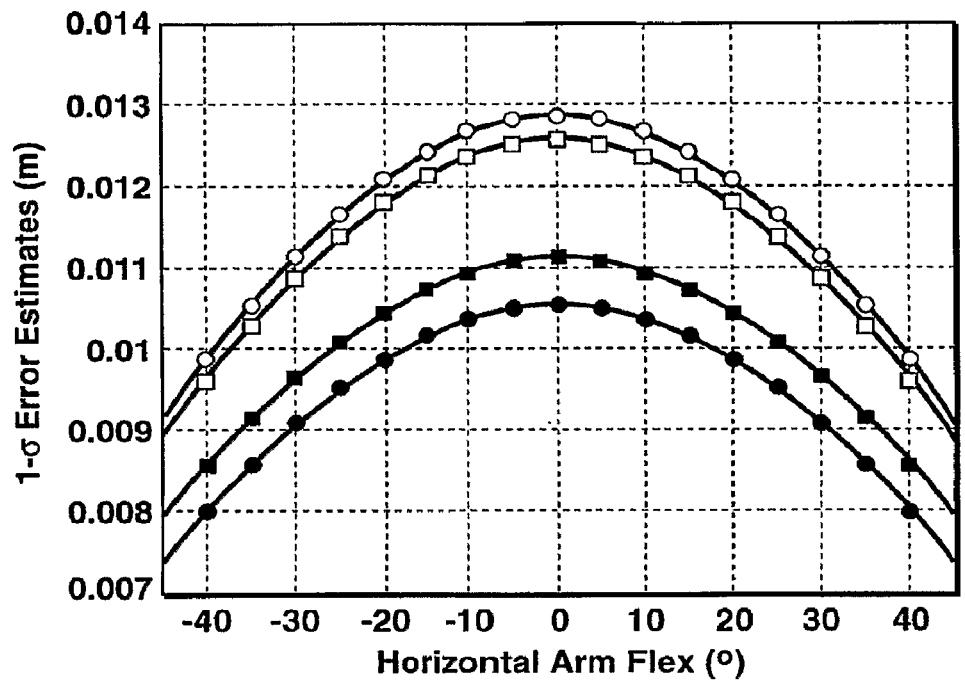
FIG. 16 shows simulated results for the same variables as FIG. 15 except the electrode arm flex is vertical (relative to the receiver frame) instead of horizontal.
Figure 17:
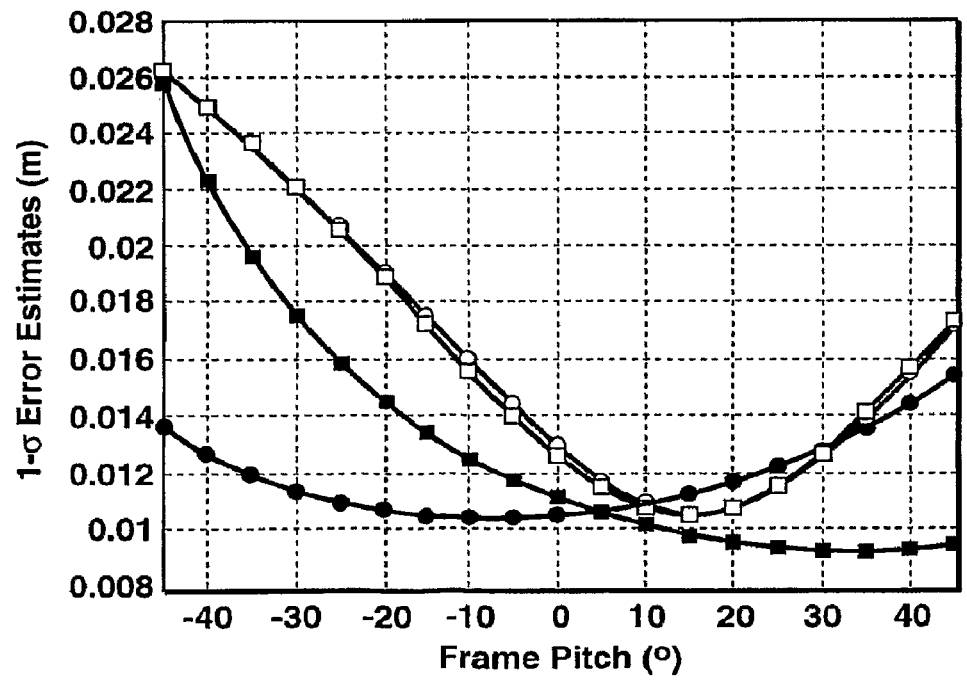
FIG. 17 shows precision of 5 m electrode positions based on simulated acoustic ranging at a single acoustic range precision, as a function of frame pitch angle.
Figure 18:
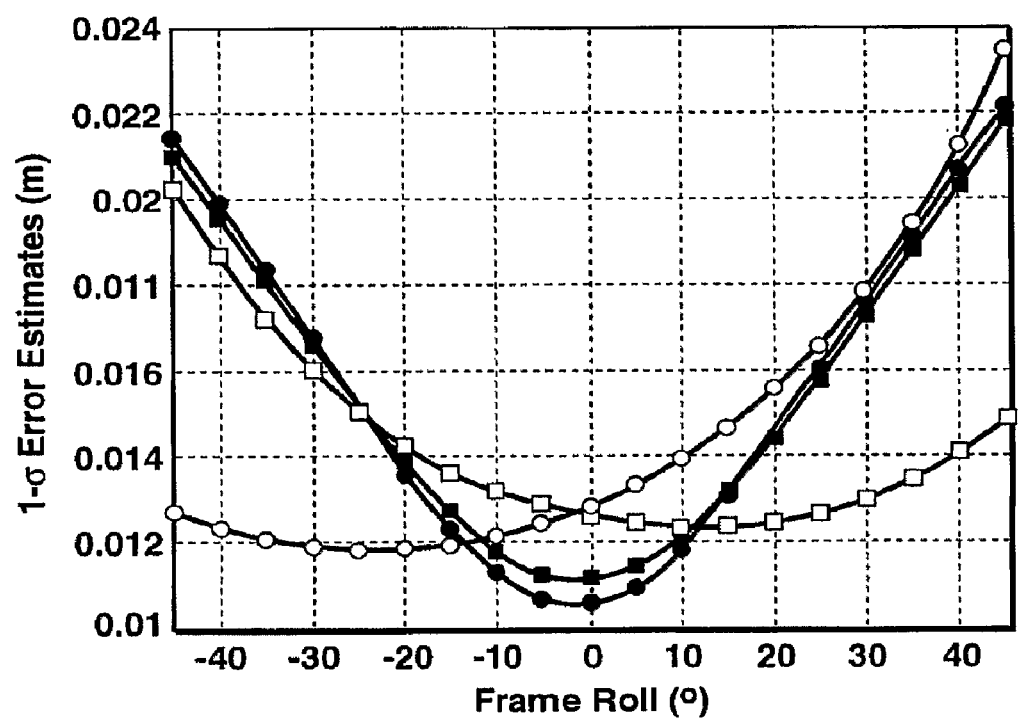
FIG. 18 shows precision of 5 m electrode positions based on simulated acoustic ranging at a single acoustic range precision, as a function of frame roll angle.

The same $1\sigma$ requirement ($\alpha<0.409°$ and the corresponding limit for semi-major error <0.0358 m) was used in further simulations in which the horizontal arms were flexed vertically, and the receiver frame was tilted ($\beta$ or $\gamma$). The results are illustrated in FIGS. 16, 17 and 18 for an acoustic range precision of 0.00225 m (2.25 mm) ($1\sigma$). The four curves in each drawing represent the four horizontal dipole arms such as A, B, C, and D in FIG. 8. FIG. 16 corresponds to FIG. 15, except that the $1\sigma$ error in the position of electrodes mounted on 5 m arms as determined by ranging is plotted vs. vertical arm flex in degrees (relative to the receiver frame) in FIG. 16, whereas in FIG. 15 the abscissa variable is horizontal arm flex in degrees. FIGS. 17 and 18 show the sensitivity of electrode position precision to frame pitch ($\beta$) in degrees (FIG. 17) and to frame roll (γ) in degrees (FIG. 18). The operational envelopes are all −45.0°<β or γ (1σ)<+45.0°, i.e. all plotted values are less than the target precision limit 0.0358 m. Thus, the 3-dimensional attitude (α, β and γ) can be estimated to <1° (95% CL) within envelopes −45.0°<α, β or γ<+45.0°, which are significantly greater than the expected variations in operational environments.

The foregoing application is directed to particular embodiments of the present invention for the purpose of illustrating it. It will be apparent, however, to one skilled in the art, that many modifications and variations to the embodiments described herein are possible. For example, the invention is described in the context of seafloor electric field receivers, yet it will be obvious to the reader that the same techniques can be applied to determine the orientation of a flexible arm mounted on any autonomous device that has to be remotely deployed in a location such as the ocean bottom where it is not possible to position the arm as desired or to directly measure its orientation angles (such as seismic receivers used for ocean bottom cable surveys). All such modifications and variations are intended to be within the scope of the present invention, as defined in the appended claims.

The methods claimed herein for measuring orientation angles, or resolving field vectors into components using such orientation angles, utilize a computer for performing certain steps in preferred embodiments of the invention, i.e. are computer implemented. The resulting orientation angles or field components may then be downloaded or saved to computer memory.

The invention claimed is:

1. A receiver for measuring at least two orthogonal electric field components for remote deployment in electromagnetic surveying, comprising:
   (a) a frame;
   (b) at least two pairs of electrodes, each electrode of a pair being attached to the frame by an arm, each arm extending from opposite sides of the frame to form a dipole, the at least two dipoles being disposed to be approximately orthogonal to each other;
   (c) an attitude sensor mounted on the frame adapted to measure the three-dimensional angular orientation of the frame; and
   (d) at least one positioning sensor located on or within each electrode arm, wherein the least one positioning sensor is constructed and arranged to measure position relative to the frame.

2. The receiver of claim 1, further comprising:
   a data storage device affixed to the frame and electrically connected to each electrode and adapted to record the electric signals detected by the dipoles; and
   a data storage device affixed to the frame and connected to each positioning sensor and adapted to record signals generated by the positioning sensors.

3. The receiver of claim 1, further comprising at least one clock adapted to provide a time scale for the recorded signals.

4. The receiver of claim 1, wherein the number of mutually orthogonal dipoles is three.

5. The receiver of claim 1, wherein the electrode arms are flexible.

6. The receiver of claim 1, wherein the at least one positioning sensors are attitude sensors, affixed to the arm at measured intervals along the length of the arm, one such sensor being affixed substantially at the location of the electrode, and further comprising a control unit within the frame and in communication with each attitude sensor.

7. The receiver of claim 6, wherein the control unit includes a power source, a data storage device, communications circuitry, and a clock.

8. The receiver of claim 1, wherein the at least one positioning sensor per arm is an acoustic sensor affixed to the arm substantially at the location of the electrode and pointing to the receiver frame, and further comprising a plurality of acoustic transponders mounted on the receiver frame and a control unit within the frame and in communication with each acoustic sensor, wherein, in operation, each receiver mounted acoustic transponder transmits an acoustic pulse signal to each electrode arm sensor, which respond with a pulse received by the receiver-mounted sensors, providing signal data to the control unit from which the two-way travel times of the acoustic pulse signal can be calculated.

9. The receiver of claim 8, wherein the number of transponders mounted on the receiver frame are at least three in number, and are non-coplanar with each electrode arm sensor.

10. The receiver of claim 8, wherein the acoustic sensors on the electrode arms are transponders.

11. The receiver of claim 8, wherein the acoustic sensors on the electrode arms are responders, and further comprising a control unit in the receiver frame electrically connected by wire cable to all acoustic sensors.

12. The receiver of claim 1, wherein the at least one positioning sensor per arm is an acoustic sensor affixed to the arm substantially at the location of the electrode and pointing to the receiver frame, and further comprising an acoustic transducer mounted on the receiver frame and a control unit within the frame and in communication with each acoustic sensor, said frame-mounted transducer having three elements configured in a mutually orthogonal array, wherein, in operation, the receiver-mounted transducer transmits an acoustic pulse signal to each electrode arm sensor, which respond with a pulse received by the receiver-mounted transducer, providing signal data to the control unit from which the two-way travel time of the acoustic pulse signal and a horizontal angle and a vertical angle specifying direction from the receiver-mounted transducer to an electrode arm sensor can be calculated.

13. The receiver of claim 12, wherein the acoustic sensors on the electrode arms are acoustic transponders.

14. The receiver of claim 12, wherein the acoustic sensors on the electrode arms are responders, and further comprising a control unit in the receiver frame electrically connected by hard wire cable to all acoustic sensors.

15. The receiver of claim 1, wherein the at least one positioning sensor on or within each electrode arm are at least one light-transmitting fiber cable extending the length of the arm, and further comprising a control unit within the frame connected to and providing light to the fiber cables, wherein, in operation, flexing of an arm generates strain along the fiber cables from which curvature of the arm can be estimated.

16. The receiver of claim 15, wherein each fiber in the fiber cables have alternating regions of different refractive index forming a Fiber Bragg Grating.

17. The receiver of claim 16, wherein each arm contains at least two fiber cables, located on different faces of the arm.

18. The receiver of claim 15, wherein the at least one light transmitting fiber cable per arm is a Smart cable.

* * * * *